Aug. 18, 1970   E. V. THOMAS ET AL   3,524,276
ELIMINATION OF JELLYFISH AND THE LIKE
Filed Jan. 26, 1968
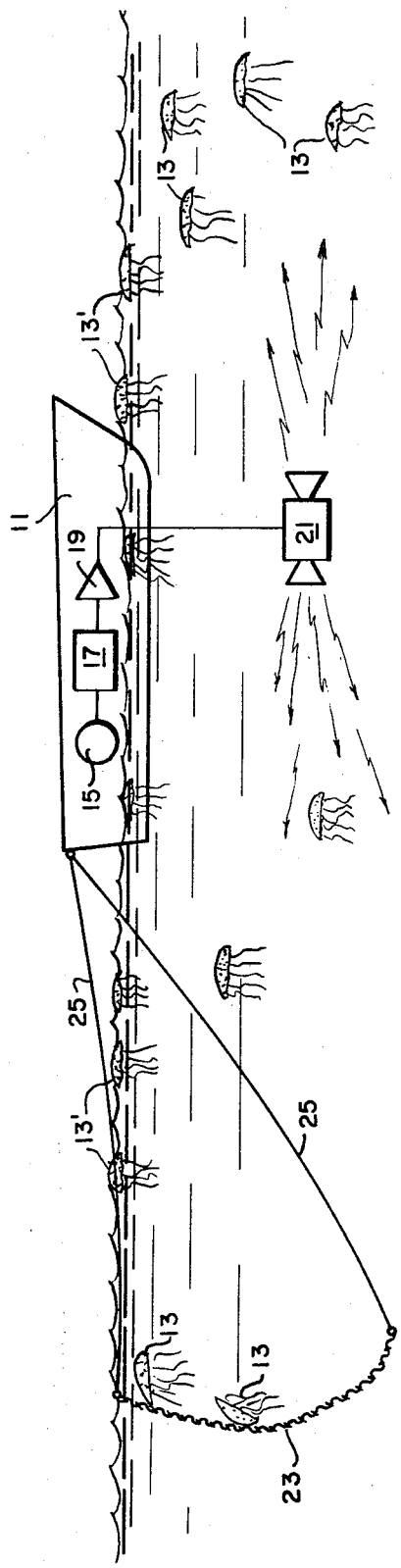
INVENTORS
EDWARD V. THOMAS
BRUCE E. DOUGLAS
BY
ATTORNEYS 3,524,276
ELIMINATION OF JELLYFISH AND THE LIKE
Edward V. Thomas, Severna Park, and Bruce E. Douglas, Edgewater, Md., assignors to the United States of America as represented by the Secretary of the Navy
Filed Jan. 26, 1968, Ser. No. 700,991
Int. Cl. A01k 73/00, 79/00
U.S. Cl. 43—4.5          5 Claims

ABSTRACT OF THE DISCLOSURE

Sea creatures of the genus Medusa (sea nettles, jellyfish) are driven to the surface of water by exposure to acoustic waves at frequencies from about 2 to about 3.2 kilohertz. The creatures may then be identified and gathered by net, centrifugal separators, or other means, and disposed of.

---

The invention described herein may be manufactured and used by or for the Government of the United States of America for governmental purposes without the payment of any royalties thereon or therefor.

BACKGROUND AND SUMMARY

It is well known that in certain waters, such as the Chesapeake Bay in particular, creatures of the genus Medusa are present in great numbers causing inconvenience, discomfort and often serious injury to divers and swimmers. Acoustic and electrical impulses in general are known to be capable of causing fish to react thereto. For example, intermittent acoustic waves are said to repel sharks in U.S. Pat. No. 3,317,889.

In the Chesapeake Bay we have discovered that when a submerged non-directional sonar projector of about 1 watt input power is swept through frequencies from about 2 to about 3.2 kilocycles (kilohertz) repetitively, there occurs within about a one mile radius an appearance at the water surface of great numbers of genus Medusa creatures. It is observed that the creatures appear to be trying to swim upward through the water surface as long as the sonar projector is energized. Upon deenergization of the sonar projector the creatures return to the depths and appear to act normally. Protracted energization of the projector for several days causes the creatures to die of exposure to the atmosphere.

The size of the creatures affected appears to be of from ½-inch diameter to 6 inches diameter. The diameter of the creatures affected appears to be inversely proportional to frequency.

BRIEF DESCRIPTION OF THE DRAWINGS

The nature of the discovery will be better understood by reference to the drawing in which the single figure depicts the environment and a view of the apparatus by which the discovered phenomenon is produced.

DETAILED DESCRIPTION AND OPERATION

Referring to the single figure, a ship 11 located in the vicinity of Medusa creatures 13 has on board equipment including a power source 15, a sweep oscillator 17 providing oscillations via a power amplifier 19 to a non-directional underwater transducer or projector 21 of the electromechanical or piezoelectric type. When sweep oscillator is swept through the range of about 2 to about 3.2 kHz., creatures of genus Medusa designated 13 are seen to begin appearing at the surface of the water. As successive sweeps through the frequency range occur, larger numbers of the creatures appear, and the creatures appear to be attempting to lift themselves clear of the water surface, of course without success. The sweep rate is not critical. A cycle of from about 5 to 15 minutes has been found suitable.

In carrying out the practical utilization of the discovery, it is realized that any suitable well known means, such as nets 23 towed via lines 25 or centrifuges, may be employed to gather in the creatures and dispose of them, thus clearing a volume of water of the pests. Of course, the projector 21 may be programmed and made directional in any suitable manner to project so that periodic removal of the Medusa creatures is enabled.

It is also understood that the projector 21 may be energized for a protracted period, say several days, a week, or more, in which instance prolonged exposure of the Medusa creatures at the water surface will kill them. However, as is well known, the sting-causing body members of the creatures are still extant after demise. Therefore, use of the projector 21 merely to cause demise of the creatures may not necessarily solve the problem of removal of sting-causing bodily elements of Medusa.

Of course, realization of the phenomenon as described whereby the Medusa creatures are driven upward to the water surface for easy removal thereat may be achieved by any suitable well known apparatus. For example, purely mechanical means may be employed to produce acoustic frequencies sweeping through the 2.0 to 3.5 kHz. band, such as variably tuned mechanical resonators. Of course, electromechanical transducers of any suitable design may also be used. Obviously, the greater the output power of the transducer, the greater the range of effectiveness. The disclosed phenomenon has been observed at ranges in excess of 1 mile from the projector when greater power is employed.

In carrying out the principles disclosed herein, it is not necessary that the entire frequency range including 2.0 to 3.2 kilocycles be swept. For example, larger jellyfish up to about 6 inches in diameter may be driven to the water surface by employing the range 2.0 to about 2.5 kilocycles. Higher frequencies within the band 2.0 to about 3.2 kcs. may be used to drive smaller creatures down to about ½-inch diameter to the surface.

What is claimed is:
1. The method of driving sea creatures of the jellyfish type to the surface of water thereby facilitating their easy identification, expiration and removal comprising the steps of:
   projecting for a predetermined period within the water acoustic waves swept through a frequency range including at least a finite portion of the range about 2.0 to 3.2 kilocycles; and,
   engaging the surfaced creatures with body means whereby the creatures may be separated from the water.
2. The method according to claim 1 wherein said projecting of acoustic waves is periodic.
3. The method of driving sea creatures of the jellyfish type to the surface of water thereby facilitating their easy identification and removal comprising the steps of:
   projecting within the water acoustic waves swept through a frequency range of from about 2.0 kilocycles to about 3.2 kilocycles, whereby the diameter of the creatures affected is from about ½ inch diameter to about 6 inches in diameter; and,
   engaging the surfaced creatures with body means whereby the creatures may be separated from the water.
4. The method of driving creatures of the jellyfish type to the surface of water and for removing said creatures from an area of the water surface comprising the steps of:
   projecting within the water acoustic waves having at least one frequency in the range of about 2.0 kilocycles to about 3.2 kilocycles, and
   engaging the surfaced creatures with body means whereby the creatures may be separated from the water.

5. Apparatus for driving creatures of the jellyfish type to the surface of water comprising:

acoustic wave producing means including a power source and a submerged transducer;

means including a sweep frequency oscillator connectively associated with said acoustic wave producing means for causing said transducer to project acoustic waves of at least one frequency within the range of about 2.0 kilocycles to about 3.2 kilocycles; and body means connectively associated with said acoustic wave producing means for engaging the surfaced creatures and removing them from a predetermined area of the water surface.

References Cited

UNITED STATES PATENTS

| | | | |
|---|---|---|---|
| 978,882 | 12/1910 | Freer | 43—17.1 |
| 2,757,475 | 8/1956 | Pankove | 43—17.1 |
| 2,821,805 | 2/1958 | Kunze | 43—17.1 |
| 3,229,404 | 1/1966 | Abrahamsen et al. | 43—4.5 |
| 3,317,889 | 5/1967 | Barrand | 340—5 |

WARNER H. CAMP, Primary Examiner

U.S. Cl. X.R.

43—17.1